(12) United States Patent
Fujiwara et al.

(10) Patent No.: US 6,914,738 B2
(45) Date of Patent: Jul. 5, 2005

(54) APPARATUS AND METHOD FOR CONTROLLING WRITE CURRENT SUPPLIED TO HEAD

(75) Inventors: Seishiro Fujiwara, Ome (JP); Hiroshi Okamura, Hamura (JP); Hiromi Sakata, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 62 days.

(21) Appl. No.: 10/422,912

(22) Filed: Apr. 25, 2003

(65) Prior Publication Data

US 2003/0223143 A1 Dec. 4, 2003

(30) Foreign Application Priority Data

May 31, 2002 (JP) ........................................ 2002-160685

(51) Int. Cl.[7] .............................. G11B 5/02; G11B 21/02
(52) U.S. Cl. ............................. 360/68; 360/46; 360/75
(58) Field of Search ............................. 360/66–68, 46, 360/75

(56) References Cited

U.S. PATENT DOCUMENTS

| 6,064,534 | A | * | 5/2000 | Simozato | 360/46 |
| 6,297,921 | B1 | | 10/2001 | Price, Jr. et al. | |
| 6,381,086 | B1 | | 4/2002 | Koenig et al. | |
| 6,496,317 | B2 | * | 12/2002 | Lacombe | 360/68 |
| 6,549,353 | B1 | | 4/2003 | Teterud | |
| 2001/0022700 | A1 | | 9/2001 | Lacombe | |
| 2002/0141094 | A1 | * | 10/2002 | Suzuki et al. | 360/68 |
| 2003/0112541 | A1 | * | 6/2003 | Lee et al. | 360/55 |

FOREIGN PATENT DOCUMENTS

| EP | 1 113 423 A2 | 7/2001 |
| JP | 59-58607 | 4/1984 |
| JP | 10-312504 | 11/1998 |
| JP | 2000-222703 | 8/2000 |
| JP | 2000-235703 | 8/2000 |
| JP | 2001-236603 | 8/2001 |
| JP | 2001-273603 | 10/2001 |
| WO | 01/29829 A1 | 4/2001 |

OTHER PUBLICATIONS

Japanese Office Action, dated Aug. 3, 2004 for Patent Application No. 2002–160685.
Australian Patent Office Search Report for Application No. SG 200301704-3, dated Oct. 11, 2004.

* cited by examiner

Primary Examiner—David Hudspeth
Assistant Examiner—Varsha A. Kapadia
(74) Attorney, Agent, or Firm—Pillsbury Winthrop Shaw Pittman, LLP

(57) ABSTRACT

A main controller controls the current in an overshoot part included in the write current supplied from a write driver to a head in accordance with write data via an overshoot controller in accordance with the temperature detected by a temperature sensor.

10 Claims, 16 Drawing Sheets

| HEAD (H) | TEMPERATURE (T) | DELAY (d) | WRITE CURRENT (Iw) |
|---|---|---|---|
| H0 | T1 | d11 | Iw11 |
| H0 | T2 | d12 | Iw12 |
| ⋮ | ⋮ | ⋮ | ⋮ |
| H1 | T1 | d21 | Iw21 |
| H1 | T2 | d22 | Iw22 |
| ⋮ | ⋮ | ⋮ | ⋮ |

| ZONE(Z) | TEMPERATURE(T) | DELAY(d) | WRITE CURRENT(Iw) |
|---|---|---|---|
| Z1 | T1 | d11 | Iw11 |
|  | T2 | d12 | Iw12 |
|  | ⋮ | ⋮ | ⋮ |
| Z2 | T1 | d21 | Iw21 |
|  | T2 | d22 | Iw22 |
|  | ⋮ | ⋮ | ⋮ |
| Z3 | T1 | d31 | Iw31 |
|  | T2 | d32 | Iw32 |
|  | ⋮ | ⋮ | ⋮ |

US 6,914,738 B2

APPARATUS AND METHOD FOR CONTROLLING WRITE CURRENT SUPPLIED TO HEAD

CROSS-REFERENCE TO RELATED APPLICATIONS

This application is based upon and claims the benefit of priority from the prior Japanese Patent Application No. 2002-160685, filed May 31, 2002, the entire contents of which are incorporated herein by reference.

BACKGROUND OF THE INVENTION

1. Field of the Invention

The present invention relates to a disk storage apparatus in which data is written onto a discoid recording medium (namely, a disk medium) and data is read from the recording medium by a head. More particularly, the present invention relates to an apparatus and method for controlling a write current supplied to a head in accordance with write data.

2. Description of the Related Art

A hard disk drive is known as typified by a disk storage apparatus using a disk (disk medium) as a recording medium. The write characteristic of this hard disk drive depends on the recording density (for example, the track density TPI), temperature and the like in the environment in which an apparatus is used. Thus, Jpn. Pat. Appln. KOKAI Publication No. 10-312504 discloses a technique to assure a recording density margin (TPI margin) and a temperature margin in a hard disk drive. According to this technique (which will be referred to as the prior art hereinafter), obtaining a lower limit value of a write current relative to the temperature margin and an upper limit value of the write current relative to the TPI margin can set an optimum write current without lowering characteristics of both margins. That is, the prior art is characterized in that the write current is optimized by focusing on both the TPI margin and the temperature margin.

However, when an increase in the recording density of the disk (recording medium) advances, the influence of the magnetic leakage flux from the head on an adjacent track becomes large. Therefore, it can be expected that the upper limit value of the write current relative to the TPI margin becomes lower than the lower limit value of the write current relative to the temperature margin. In this case, both margins are hard to be assured in the prior art. Further, degradation of the recording quality in a low-temperature environment occurs.

BRIEF SUMMARY OF THE INVENTION

According to an embodiment of the present invention, there is provided a disk storage apparatus in which data is written onto a discoid recording medium and data is read from the recording medium by a head. This disk storage apparatus comprises a write driver which supplies a write current to the head in accordance with write data, a temperature sensor which detects the environmental temperature of the disk storage apparatus, and a controller which controls the overshoot current included in the write current supplied from the write driver to the head in accordance with the temperature detected by the temperature sensor.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
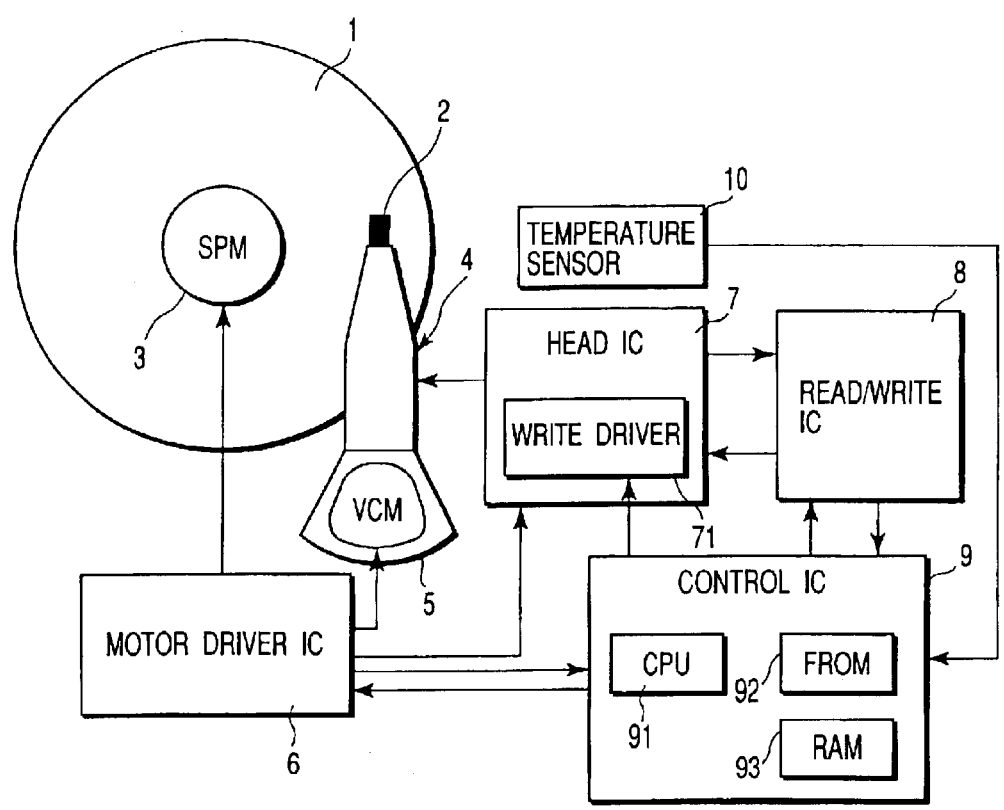
FIG. 1 is a block diagram showing a structure of a hard disk drive according to an embodiment of the present invention.

FIG. 1 is a block diagram showing a structure of a hard disk drive according to an embodiment of the present invention. In the hard disk drive (which will be referred to as an HDD hereinafter) shown in FIG. 1, a discoid recording medium (magnetic disk) 1 has upper and lower disk sides. At least one disk side of the two disk sides of the recording medium 1, for example, both disk sides form recording surfaces on which data is magnetically recorded. A head (magnetic head) 2 is arranged in accordance with each recording surface of the recording medium 1. The head 2 is used for data writing (data recording) onto the recording medium 1 and data reading (data reproduction) from the recording medium 1. This head 2 is a composite head constituted by, e.g., a read head and a write head (inductive head). The read head is constituted by an MR (Magneto-Resistive) element, and the write head is constituted by an inductive thin-film element. It is to be noted that the HDD including a single recording medium 1 is assumed in the structure depicted in FIG. 1 but it may be an HDD in which a plurality of recording mediums 1 are stacked.

The recording medium 1 is rotated at high speed by a spindle motor (which will be referred to as an SPM hereinafter) 3. The head 2 is attached at an end of an actuator (carriage) 4. The head 12 moves in the radial direction of the recording medium 1 in accordance with swiveling of the actuator 4. As a result, the head 2 is positioned on a target track. The actuator 4 has a voice coil motor (which will be referred to as a VCM hereinafter) 5 which can be a drive source of the actuator 4. The actuator 4 is driven by the VCM 5. The SPM 3 and the VCM 5 are driven by respective driving currents supplied from a motor driver IC (Integrated Circuit) 6. The motor driver IC 6 is a motor driver realized as a chip and constitutes an SPM driver and a VCM driver. A value (control quantity) used to determine the driving current supplied from the motor driver IC 6 to each of the SPM 3 and the VCM 5 is determined by a CPU 91 in a control IC 9.

The head 2 is connected to a head IC 7. The head IC 7 includes a write driver 71 which converts write data into a write current and a read amplifier (not shown) which amplifies the read signal read by the head 2. The head IC 23 is connected to a read/write IC (read/write channel) 8. The read/write IC 8 executes various kinds of signal processing. This signal processing includes A/D (analog/digital) conversion processing relative to the read signal, processing to encode write data and processing to decode read data.

The control IC 9 is the main controller of the HDD. The control IC 9 controls respective devices in the HDD (for example, the motor driver IC 6, the head IC 7 and the read/write IC 8). To the control IC 9 is connected a temperature sensor 10 used to detect the temperature of the HDD. The control IC 9 includes a CPU 91, an FROM (Flash Read Only Memory) 92, and a RAM (Random Access Memory) 93. The FROM 92 is a rewritable nonvolatile memory. In the FROM 92 is stored a control program used to control the motor driver IC 6, the head IC 7, the read/write IC 8 and the like. Further, a later-described delay table 921 (see FIG. 5) is stored in the FROM 92. A storage area in the RAM 93 is allocated as a work area and the like used by the CPU 91. The CPU 91 executes the control program stored in the FROM 92. In particular, the CPU 91 executes to a write driver a setting operation for the write current driving optimum for a temperature detected by the temperature sensor 10.

Here, description will now be given as to the relationship between the write current and the overwrite characteristic and that between the write current and the Adjacent Track Erase characteristic (which will be referred to as the ATE characteristic hereinafter), respectively. In general, data is written to the recording medium (magnetic disk) in the HDD by overwriting new data with respect to previously written data. In the HDD, therefore, a characteristic indicative of the state that the original data on which new data is to be overwritten is not completely erased but remains (namely, the overwrite characteristic) is important.

In order to obtain the overwrite characteristic, a signal is first written to the recording medium with a given low frequency f1. The signal written to the recording medium is read by the head. Then, a read signal (reproduction signal) having a peak only in the frequency f1 is output from the head. Subsequently, a signal of a high frequency f2 is overwritten in an area of the recording medium in which the signal is written with the low frequency f1. The signal of the high frequency f2 is read by the head. Then, the read signal output from the head includes not only the peak of the frequency f2 but also the peak of the frequency f1 even though the level is low. That is, the original signal of the frequency f1 remains on the recording medium irrespective of overwriting the signal of the frequency f2. The ratio S2/S1 of the signal level S2 of the original write signal of the frequency f1 relative to the signal level S1 of the remaining component of the signal of the frequency f1 is referred to as the overwrite characteristic. As the ratio S2/S1 becomes smaller, the overwrite characteristic worsens. In an HDD with a poor overwrite characteristic, there are many remaining components of the original write signal. In such an HDD, since unexpected signal components are included in the signal read by the head, erroneous information is read. Therefore, the overwrite characteristic has a strong correlation with the error rate in reading in the HDD.

Figure 2:
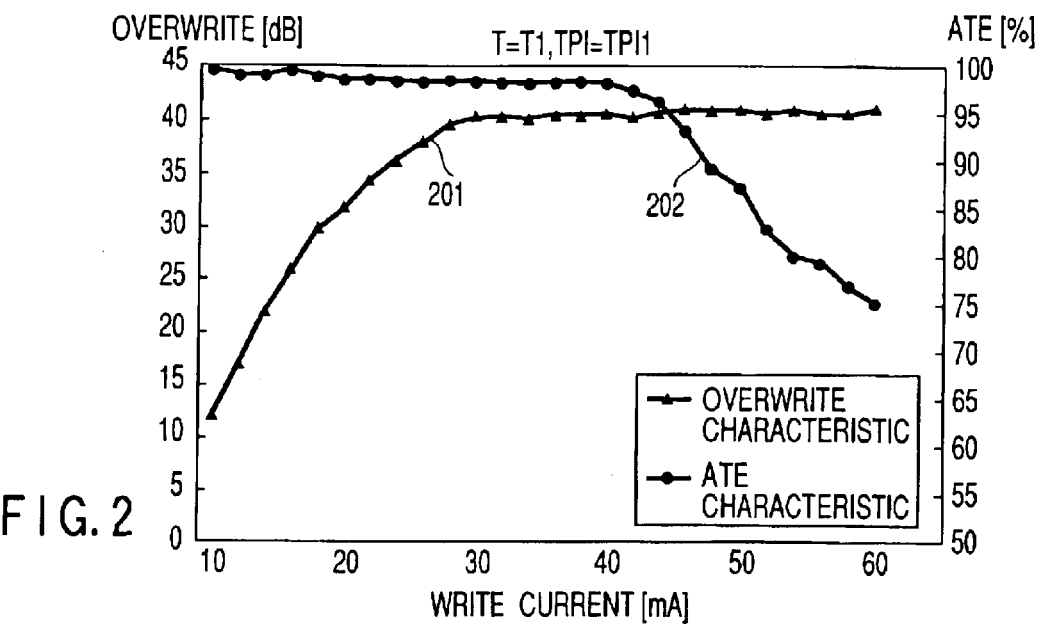
FIG. 2 is a view showing an overwrite characteristic and an ATE characteristic when a write current is changed in the state that overshoot control relative to the write current is not applied.

FIG. 2 shows the overwrite characteristic and the ATE characteristic when the write current is changed in the HDD in which later-described overshoot control relative to the write current is not applied. In FIG. 2, the curve connecting black triangles indicates the overwrite characteristic 201 relative to the write current, and the curve connecting black circles indicates the ATE characteristic 202 relative to the write current. Here, it is determined that the temperature T is T1 and the recording density (track density) TPI (Tracks Per Inch) of the recording medium is TPI1. As apparent from FIG. 2, the overwrite characteristic is improved as the write current is increased. However, the overwrite characteristic is saturated with a given write current in most cases. Therefore, it can be understood that the overwrite characteristic is not improved even if the write current is increased above that write current value.

Meanwhile, generally in an HDD, a magnetic leakage flux from the write head (write element) is generated when the write current is increased. This magnetic leakage flux may possibly magnetize the magnetic substance on another track adjacent to the track on which data should be written (recorded). The ATE characteristic is one of the indices which indicate the magnetic leakage flux from the write head. The definition of the ATE characteristic will now be given. In order to obtain the ATE characteristic, a signal is first written to a pair of tracks adjacent to a specific track with a low frequency f1. Then, the signal written to the pair of adjacent tracks is read by the head, and a signal level V1 of the read signal is measured. Thereafter, a signal having a high frequency f2 higher than the frequency f1 by several MHz is written to the specific track for approximately 100 times. Then, the signal is read from the tracks adjacent to the specific track, and a signal level V2 of that signal is measured. Subsequently, the ATE characteristic indicative of the influence of the write current on the adjacent tracks is obtained by calculating the ratio of V2 to V1. Because of the characteristic of the write head, the magnetic leakage flux from the write head becomes larger as the write current is increased. Therefore, the ATE characteristic deteriorates as the write current is increased. This is also apparent from the ATE characteristic 202 shown in FIG. 2. That is, the influence on the adjacent tracks by increasing the write current can be understood from the ATE characteristic 202 depicted in FIG. 2.

Figure 3:
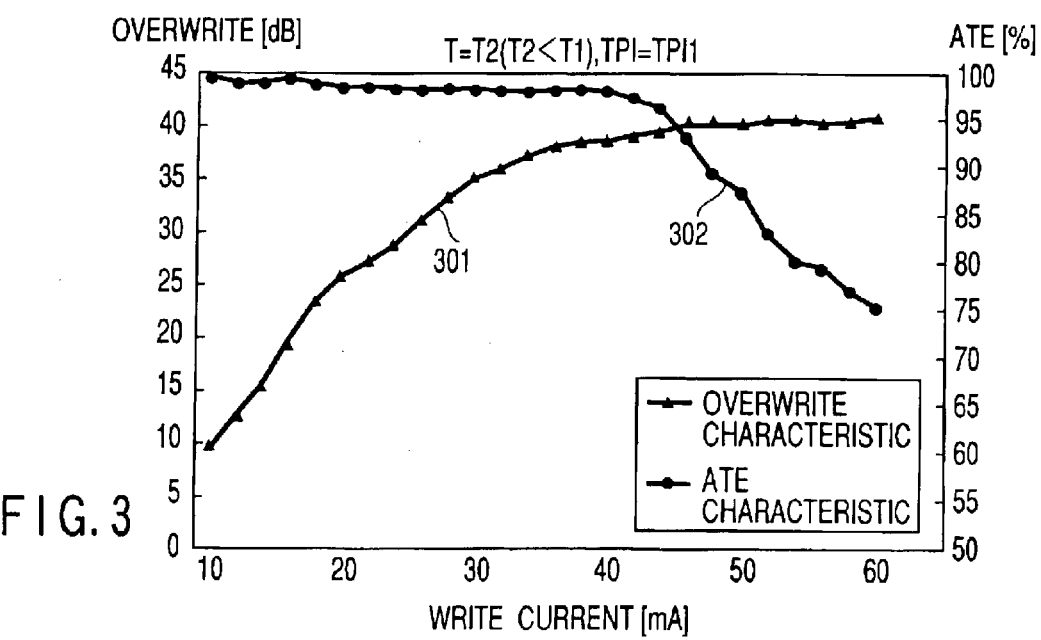
FIG. 3 is a view showing an overwrite characteristic and an ATE characteristic when the write current is changed under a low-temperature condition in the state that overshoot control relative to the write current is not applied.

It is desirable for the two characteristics illustrated in FIG. 2 to be both achieved with sufficient margins. In the example of FIG. 2, this condition can be satisfied by setting the write current to approximately 36 mA. However, the write characteristic of the recording medium deteriorates as the temperature is lowered. Thus, FIG. 3 shows an overwrite characteristic 301 and an ATE characteristic 302 when the write current is changed under the low-temperature condition. Here, conditions other than the temperature are equal to those in case of the characteristics of FIG. 2. It is to be noted that the temperature T is T2 and lower than T1 in the example of FIG. 2. In the example of FIG. 3, the write current value with which the overwrite characteristic is saturated is increased as compared with the example of FIG. 2. Conversely, as to the ATE characteristic, the write current with which the ATE characteristic is caused to deteriorate is increased. That is because the influence of the write current on the adjacent tracks is reduced under the low-temperature condition.

Figure 4:
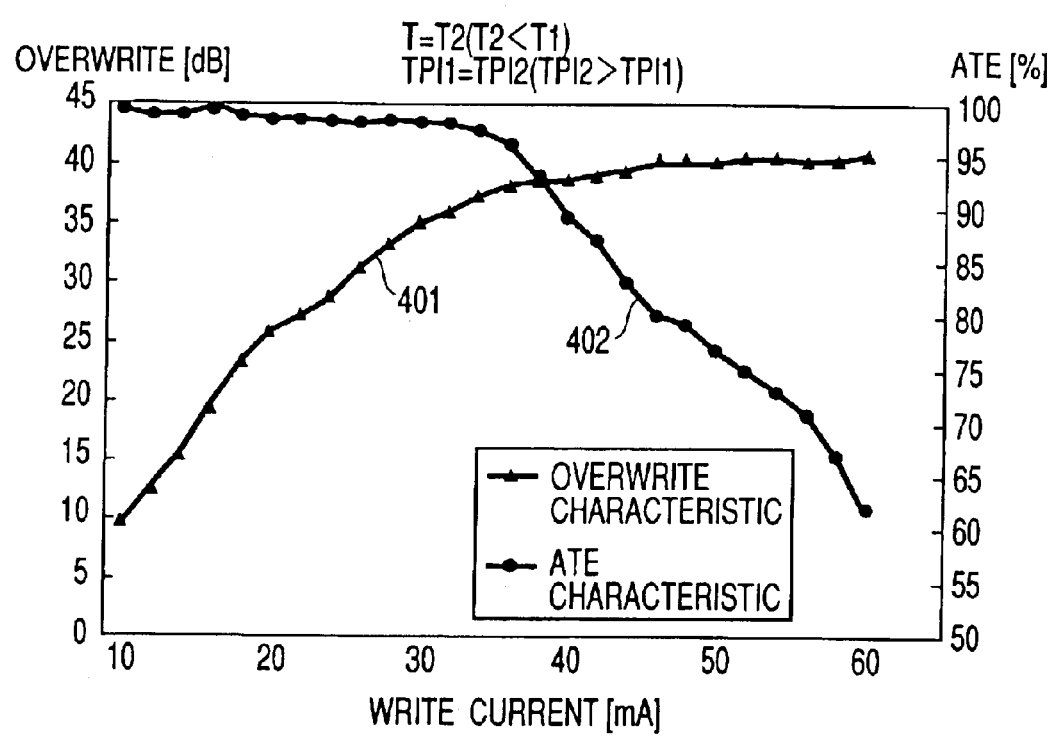
FIG. 4 is a view showing an overwrite characteristic and an ATE characteristic when the write current is changed under a low-temperature condition with a high track density in the state that overshoot control relative to the write current is not applied.

However, considering a future increase in the track density TPI involved by realization of high recording density of the recording medium, it can be expected that the following problems may occur. That is, achieving both the overwrite characteristic and the ATE characteristic with sufficient margins is very difficult. FIG. 4 shows an overwrite characteristic 401 and an ATE characteristic 402 when the write current is changed with the high track density. Here, conditions other than the track density are equal to those of the characteristics of FIG. 3 including the temperature. It is to be noted that the track density TPI is TPI2 and higher than TPI1 in the example of FIG. 3. As apparent from FIG. 4, the ATE characteristic deteriorates when the write current is increased at a low temperature with the high track density. Therefore, in the prior art disclosed in the above publication, the influence on the adjacent tracks becomes a problem with an increase in the recording density of the recording medium, and reduction in the recording quality cannot be avoided in a low-temperature environment in particular.

Figure 5:
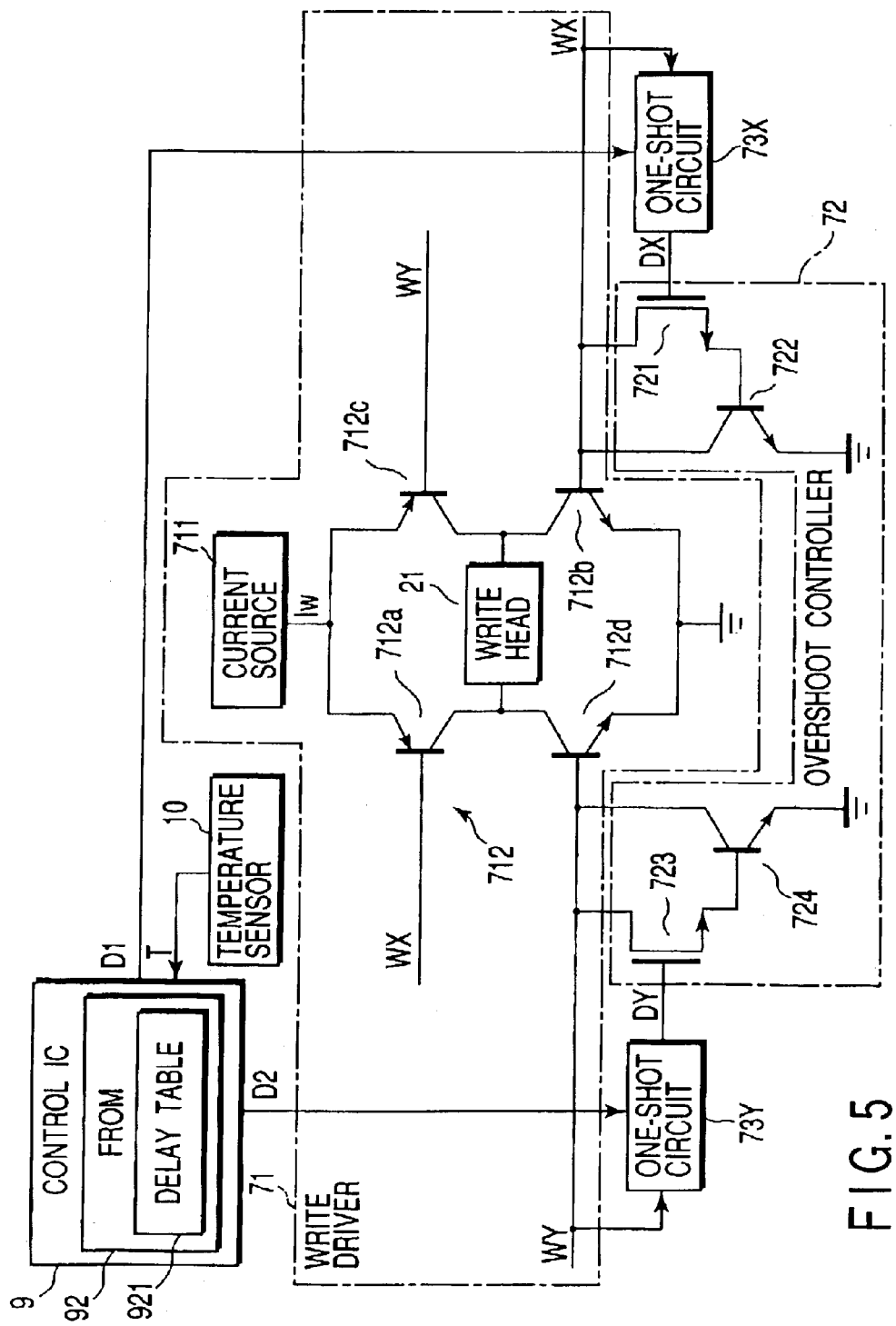
FIG. 5 is a view showing a structure of a periphery of a write driver 71 having a circuit which controls an overshoot current added thereto in a head IC 7 depicted in FIG. 1.

Therefore, in this embodiment, as described below, this problem is solved by adjusting the current in an overshoot part (namely, an overshoot current) included in the write current. FIG. 5 shows a structure of the periphery of the write driver having a circuit which controls the overshoot current added thereto in the head IC 7 depicted in FIG. 1. The write driver 71 includes a current source 711 and a bridge circuit 712. The current source 711 generates a write current Iw supplied to the write head (write element) 21 of the head 2 depicted in FIG. 1. The quantity of the write current Iw generated by the current source 711 can be changed and set. The write driver 71 supplies the write current Iw output from the current source 711 to the write head 21 by the bridge circuit 712 in accordance with a control signal WX or WY. The direction of the write current Iw flowing through the write head 21 is determined depending on the states of the signals WX and WY. The states of the signals WX and WY are determined depending on the logic value of write data supplied from the read/write IC 8. This write data is, e.g., NRZI (Non-Return to Zero Inverse) data.

The bridge circuit 712 comprises four transistors 712*a*, 712*b*, 712*c* and 712*d* which are bridge-connected. The transistors 712*a*, 712*b*, 712*c* and 712*d* are used as switching elements. Switching of the transistors 712*a* and 712*b* is controlled in accordance with the signal WX supplied to their bases. Furthermore, switching of the transistors 712*c* and 712*d* is controlled in accordance with the signal WY supplied to their bases. Here, both signals WX and WY do not become high (logic "1"). That is, the pair of transistors 712*a* and 712*b* and the pair of the transistors 712*c* and 712*d* are not simultaneously turned on.

To the write driver 71 are connected an overshoot controller 75 and one-shot circuits 73X and 73Y. The overshoot controller 72 comprises a pair of transistors 721 and 722 and a pair of transistors 723 and 724. The pair of transistors 721 and 722 and the pair of transistors 723 and 724, respectively, constitute base potential controllers which control the base potential of transistor 712*b* and the base potential of transistor 712*d*. The peak of the overshoot part in the write current Iw flowing through the write head 21 is controlled by this base potential control.

The one-shot circuits 73X and 73Y are pulse generators which output signals DX and DY each consisting of a string of pulses which appears only for a fixed time after periods D1 and D2 every time the states of the signals WX and WY change from the low level (first logic state) to the high level (second logic state), respectively. Here, D1=DY=di. This time (delay time) is changed and set by the control IC 9 (CPU 91 in the control IC 9) based on the temperature T detected by the temperature sensor 10. A delay table 921 is stored in the FROM 92 in the control IC 9. In this delay table 921 is stored information of the delay time (delay quantity) d used to set an overshoot current optimum at a predetermined temperature T in accordance with that temperature, as will be described later.

Description will now be given as to control over the overshoot current in this embodiment with reference to signal waveform charts of FIGS. 6A to 6E. First of all, it is determined that the signals WX and WY are in the states shown in FIGS. 6B and 6C. When the overshoot current is not controlled in this state, a waveform in the overshoot part included in the write current Iw is as indicated by the broken line 603 in FIG. 6A. On the other hand, when the overshoot current is controlled, the waveform in the overshoot part included in the write current Iw is as indicted by the solid line 604 in FIG. 6A.

Figure 6A:
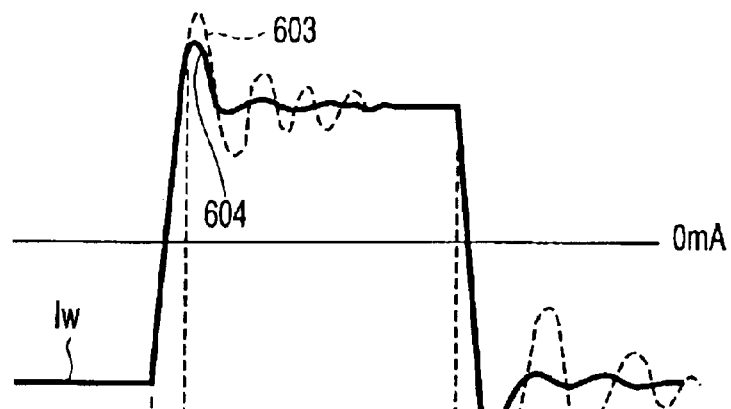
FIGS. 6A to 6E are signal waveform charts for illustrating control over the overshoot current in the embodiment.
Figure 6B:
Figure 6C:
Figure 6D:
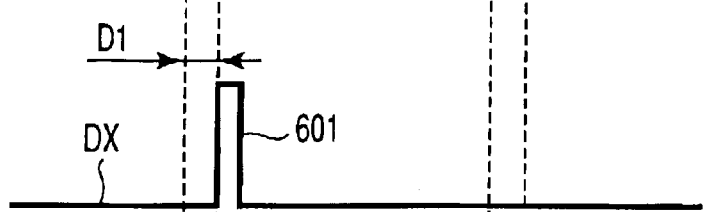
Figure 6E:

Meanwhile, the overshoot current included in the write current Iw is controlled as follows. Every time the states of the signals WX and WY change from the low level to the high level, the one-shot circuits 73X and 73Y respectively generate only one pulse 601 or 602 after periods D1 and D2 (D2=D1=di) from that point in time as shown in FIGS. 6D and 6E. The signals DX and DY including the pulses 601 and 602 are input to the overshoot controller 72.

A pair of the transistors 721 and 722 in the overshoot controller 72 reduces the base potential of the transistor 712*b* in the bridge circuit 712 with the delay of D1 from the transition point of the signal WX to the high level in accordance with the pulse 601 in the signal DX. Moreover, a pair of the transistors 723 and 724 in the overshoot controller 72 reduces the base potential of the transistor 712d in the bridge circuit 712 with the delay of D2 from the transition point of the signal WY to the high level in accordance with the pulse 602 in the signal DY. As a result, the overshoot current in the write current Iw flowing through the write head 21 is reduced. That is, the peak value of the overshoot current can be controlled by the overshoot controller 72. As apparent from FIG. 6A, the period of the overshoot part can be shortened as compared with the state before control by controlling the overshoot current.

Figure 7A:
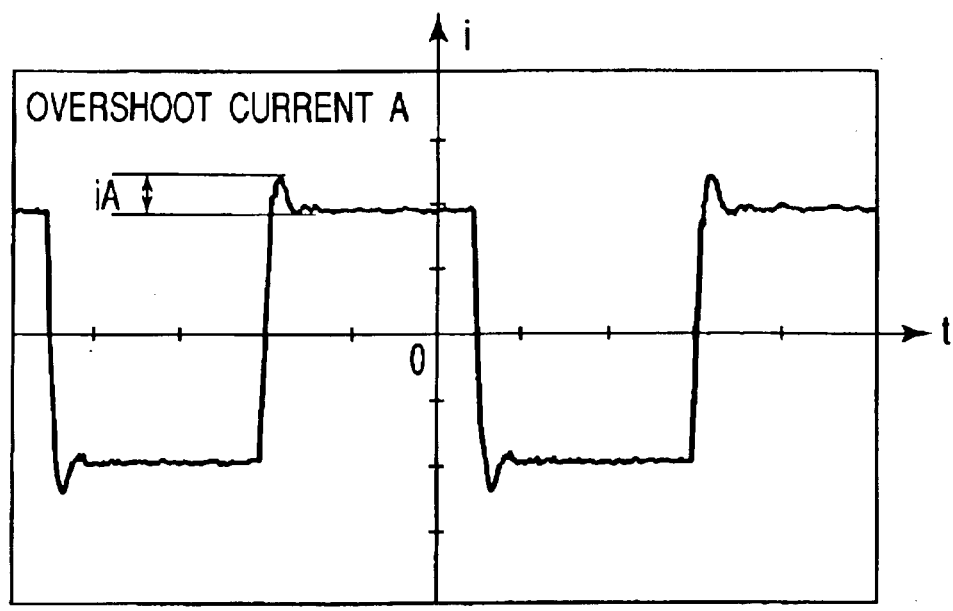
FIGS. 7A, 7B, 8A and 8B are views showing results of measuring the write current by changing a delay time in a write driver 71 having an overshoot controller 72 depicted in FIG. 5 added thereto.
Figure 7B:
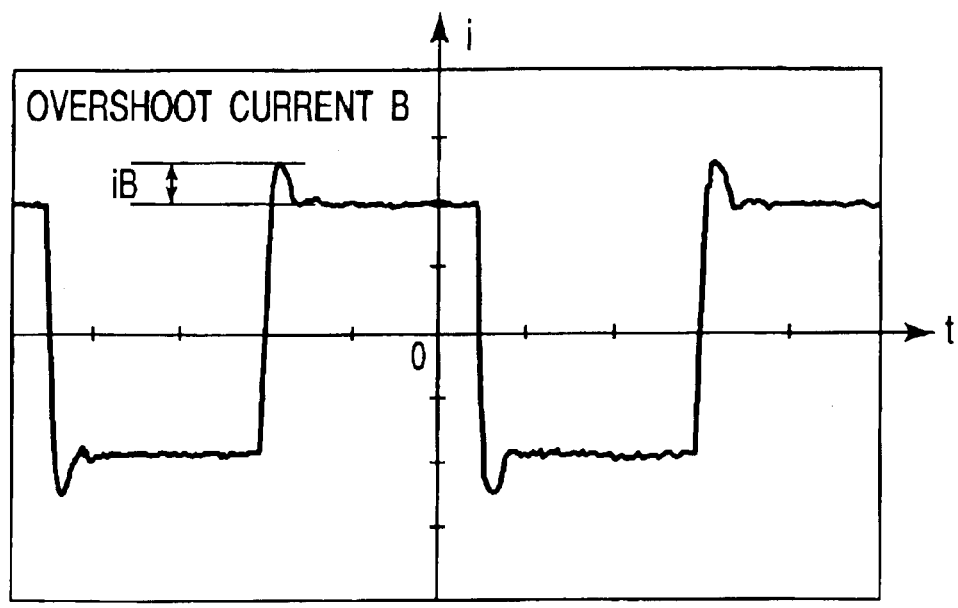
Figure 8A:
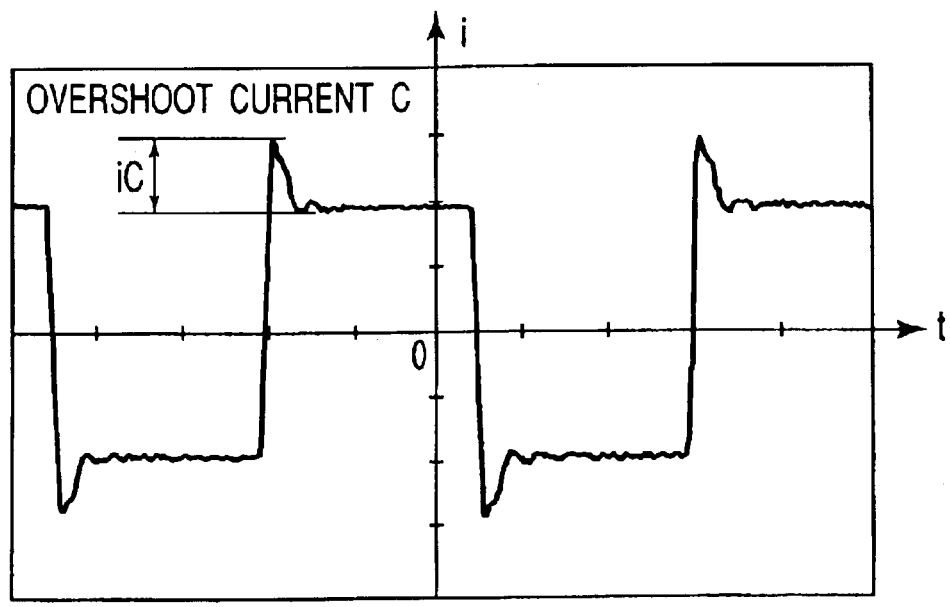
Figure 8B:
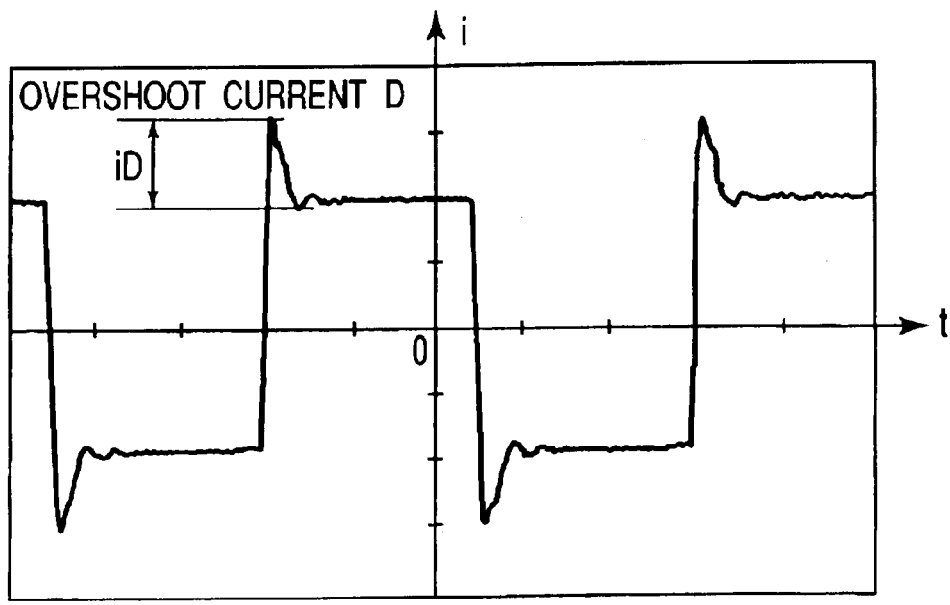

FIGS. 7A, 7B, 8A and 8B all together show results of changing the delay times D1 and D2 (D2=D1=di) and measuring the write current in the write driver 71 having the overshoot controller 72 shown in FIG. 5 added thereto. FIGS. 7A and 7B show write current waveforms when the delay times are dA and dB, respectively. FIGS. 8A and 8B show write current waveforms when the delay times are dC and dD, respectively. Here, dA<dB<dC<dD. As apparent from the drawing, the overshoot of the write current is sequentially increased by prolonging the delay time from dA to dD. That is, peak values iA, iB, iC and iD of the overshoot currents A, B, C and D corresponding to the delay times dA, dB, dC and dD are iA<iB<iC<<iD. Here, the stabilized current quantity itself after overshoot is not affected by the delay times dA, dB, dC and dD. That is, the stable part in the write current has the same current quantity irrespective of the delay time.

Figure 9A:
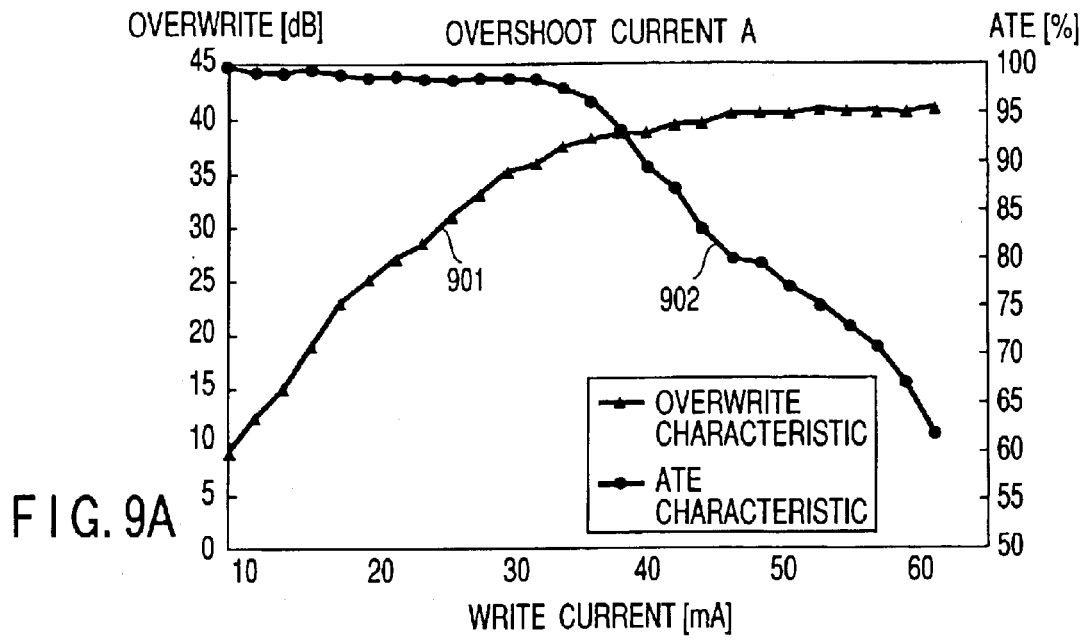
FIGS. 9A, 9B, 10A and 10B are views showing the overwrite characteristic and the ATE characteristic when overshoot control is applied in the hard disk drive depicted in FIG. 1 under the same temperature and track density as those in the example illustrated in FIG. 4.
Figure 9B:
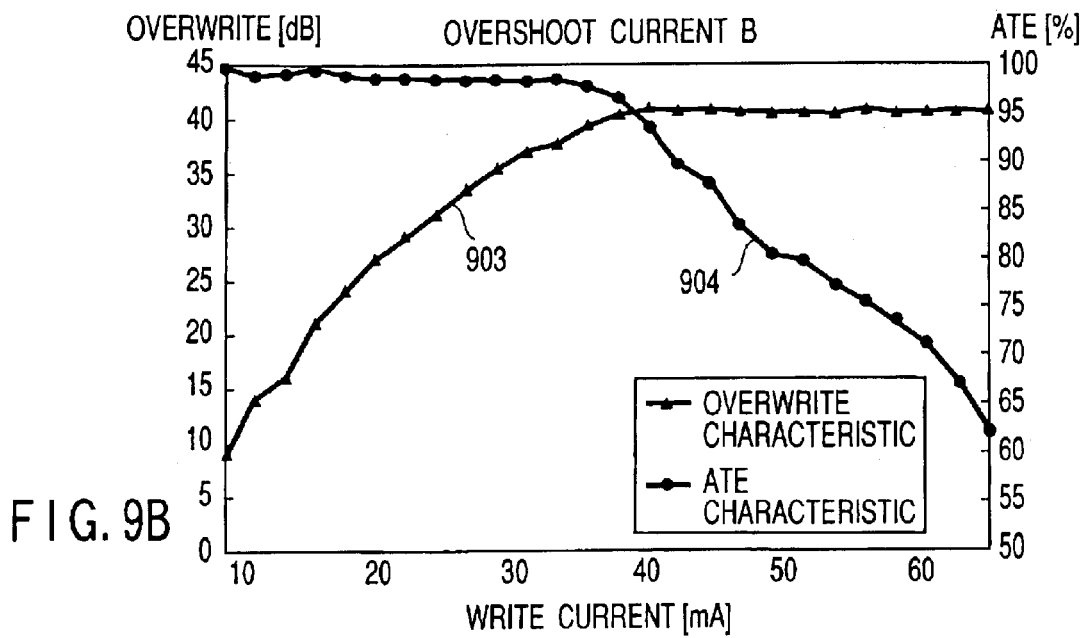
Figure 10A:
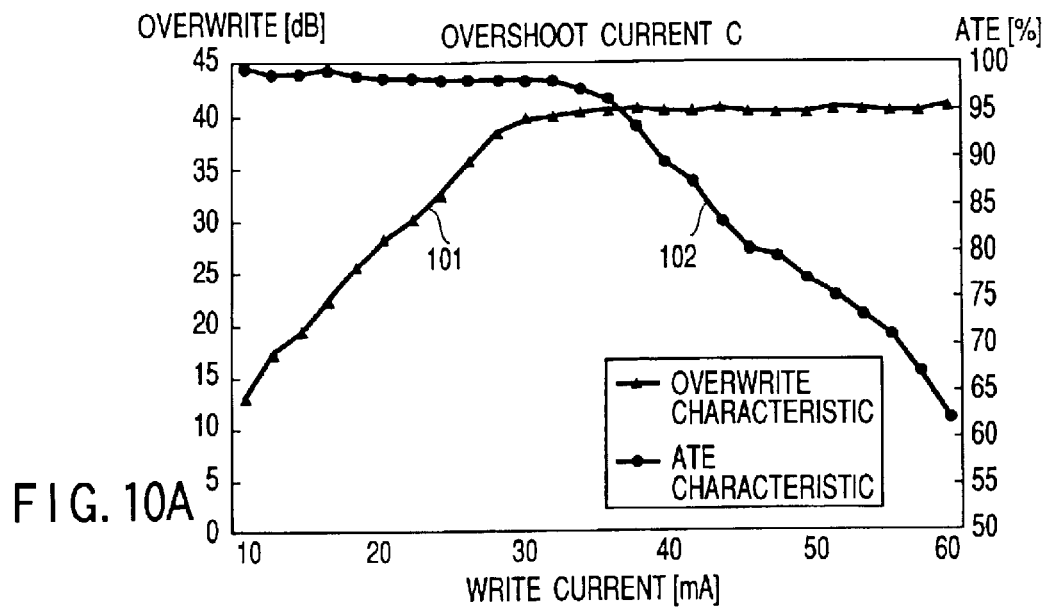
Figure 10B:
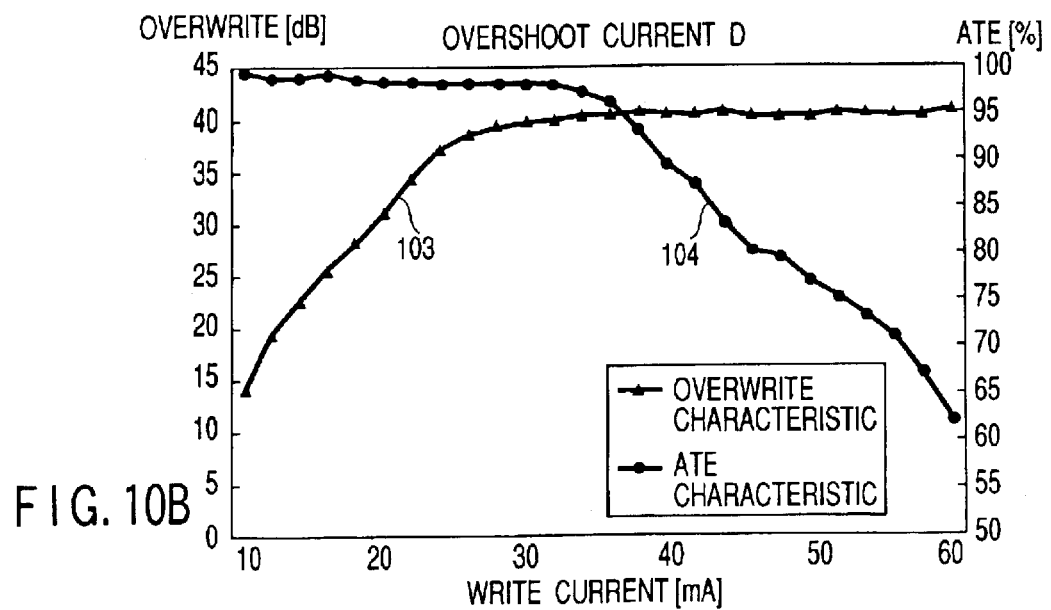

FIGS. 9A, 9B, 10A and 10B show the overwrite characteristic and the ATE characteristic when overshoot control is applied in the HDD illustrated in FIG. 1 under the same temperature and track density conditions as those in the example of FIG. 4. Here, FIGS. 9A and 9B show an overwrite characteristic 901 and an ATE characteristic 902, and an overwrite characteristic 903 and an ATE characteristic 904 when the overshoot currents A and B depicted in FIGS. 7A and 7B are applied, respectively. In addition, FIGS. 10 and 10B show an overwrite characteristic 101 and an ATE characteristic 102, and an overwrite characteristic 103 and an ATE characteristic 104 when the overshoot currents C and D depicted in FIGS. 8A and 8B are applied, respectively.

As apparent from FIGS. 7A, 7B, 8A, 8B, 9A, 9B, 10A and 10B, the overwrite characteristic is improved as the overshoot current is increased. That is, the write characteristic is improved by an increase in the overshoot current. On the other hand, as to the ATE characteristic, there is almost no influence even if the overshoot current is increased. That is, according to this embodiment, the overwrite characteristic can be improved without sacrificing the ATE characteristic by controlling the overshoot current in the write current. This improvement enables enhancement of the recording quality with the high recording density (track density) in the low-temperature environment in the HDD.

Figures 11, 12:
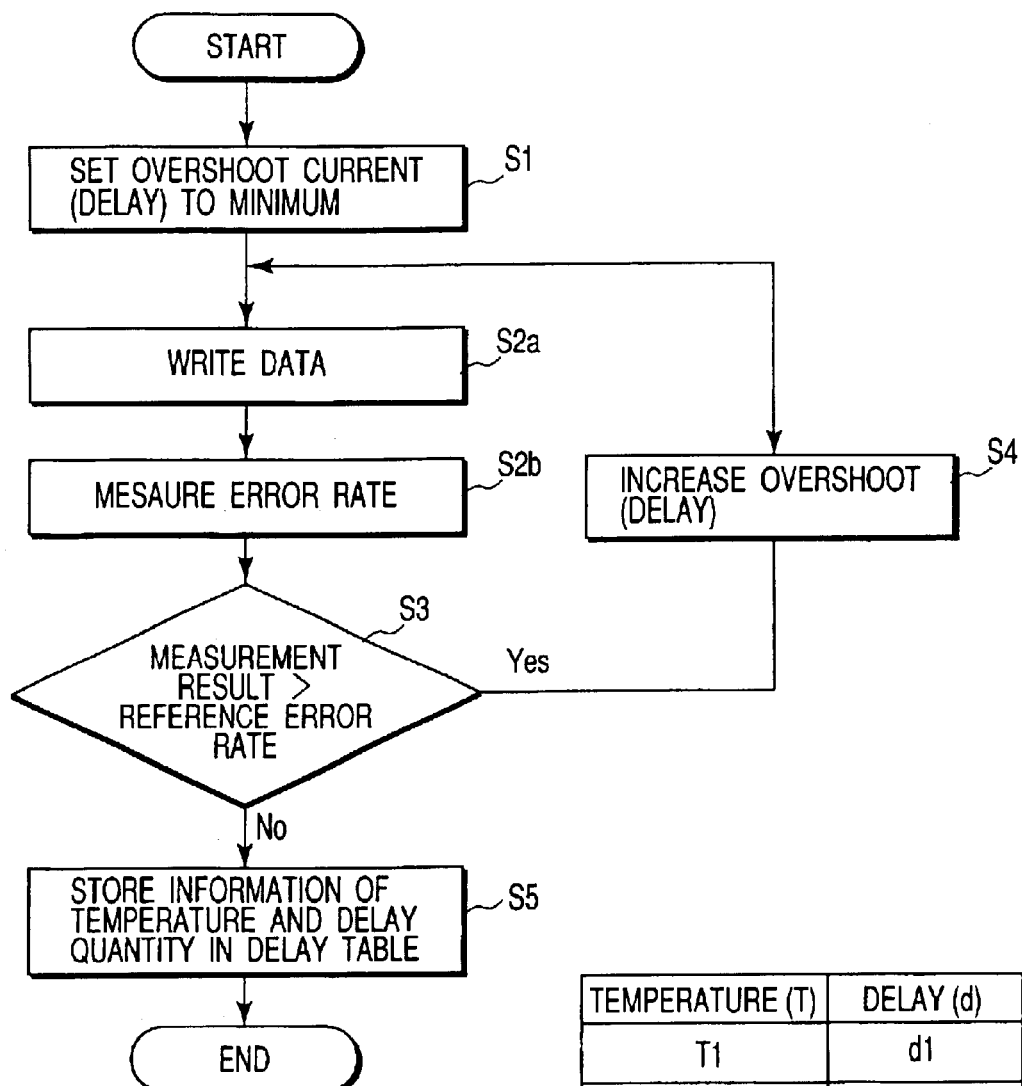
FIG. 11 is a flowchart for illustrating processing to obtain an optimum overshoot current and store it in a delay table 921 in the embodiment.
FIG. 12 is a view showing a data structure example of the delay table 921 applied in the embodiment.

Here, optimum performances at various environmental temperatures can be assured by controlling the overshoot current in accordance with the temperature detected by the temperature sensor 10. In order to achieve this, it is sufficient to use the delay table having the delay time d which determines the overshoot current quantity optimum for a predetermined temperature stored therein in accordance with this predetermined temperature. In this embodiment, this delay table 921 is stored in the FROM 92. FIG. 12 shows a data structure example of this delay table 921.

The control IC 9 (CPU 91 in the control IC 9) reads from the delay table 921 information of the delay time d corresponding to the temperature indicated by the output voltage of the temperature sensor 10 (namely, the temperature detected by the temperature sensor 10). Here, in the information of the delay time d stored in the delay table 921 in accordance with each temperature, information of the delay time d corresponding to the temperature which is closest to the detected temperature is read. Besides, it is possible to adopt a structure to read information of the delay time d corresponding to the lower limit temperature (or the upper limit temperature) in a temperature range in which the detected temperature falls in temperature ranges indicated by temperature information stored in the delay table 921. This structure is equivalent to the structure using the delay table having a delay time corresponding to a predetermined temperature range stored therein in accordance with each predetermined temperature range.

Additionally, the delay time d may be determined based on linear interpolation by using the delay times at the lower limit temperature and the upper limit temperature in the temperature range in which the detected temperature falls in accordance with the following expression.

$$d=\{(d2-d1)T+(d1T2-d2T1)\}/(T2-T1)$$

Here, T is the detected temperature, and T1 and T2 are the lower limit temperature and the upper limit temperature in a temperature range in which the detected temperature T falls, respectively. Further, d1 and d2 are delay times which give the optimum overshoot current at the lower limit temperature T1 and the upper limit temperature T2. The control IC 9 determines the delay times from the information of the delay time d read from the delay table 921, and sets the delay times as D1 and D2 in the one-shot circuits 73X and 73Y in the head IC 7.

Description will now be given as to processing to obtain the optimum overshoot current and store it in the delay table 921 in this embodiment with reference to the flowchart of FIG. 11. When shipping the HDD shown in FIG. 1, an operator sequentially switches and sets the environmental temperature T of the HDD in a plurality of stages. The operator inputs commands to direct optimization and storage of the delay times d relative to the set temperature T from a non-illustrated host (host system) to the control IC 9 of the HDD shown in FIG. 1. This series of operations can be automated.

The control IC 9 starts processing according to the flowchart of FIG. 11 in response to the commands. The control IC 9 first sets the delay times corresponding to a predetermined lowest overshoot current as D1 and D2 in the one-shot circuits 73X and 73Y in the head IC 7 (step S1). The control IC 9 writes test data to all tracks or a plurality of predetermined tracks on a corresponding recording surface of the recording medium 1 by the head 2 in this state (step S2a). Then, the control IC 9 measures the error rate in the HDD (step S2b). This error rate measurement can be realized by reading data written on the recording medium 1 in step S2a in sector units and obtaining a percentage of a sector which leads to a read error.

The control IC 9 judges whether the error rate measurement result is larger than a predetermined reference error rate (threshold value) (step S3). If the error rate measurement result is larger than the reference error rate, the control IC 9 determines that the overwrite characteristic is insufficient. In this case, the control IC 9 increases the delay time for only a corresponding time in order to increase the overshoot current by a fixed quantity (one stage) (step S4). In this state, the control IC 9 again measures the error rate (steps S2a and S2b).

On the other than, if the error rate measurement result does not exceed the reference error rate, the control IC 9 determines that the delay time d at that moment is the optimum delay time d which gives the optimum overshoot current value at the presently set temperature T. In this case, the control IC 9 stores entry information including a pair of information of the temperature T and information of the delay time d in the delay table 921 having the data structure depicted in FIG. 12 (step S5). The control IC 9 brings the delay table 921 to completion by repeatedly executing the above-described processing in accordance with each predetermined temperature.

First Modification

Figures 14, 15:
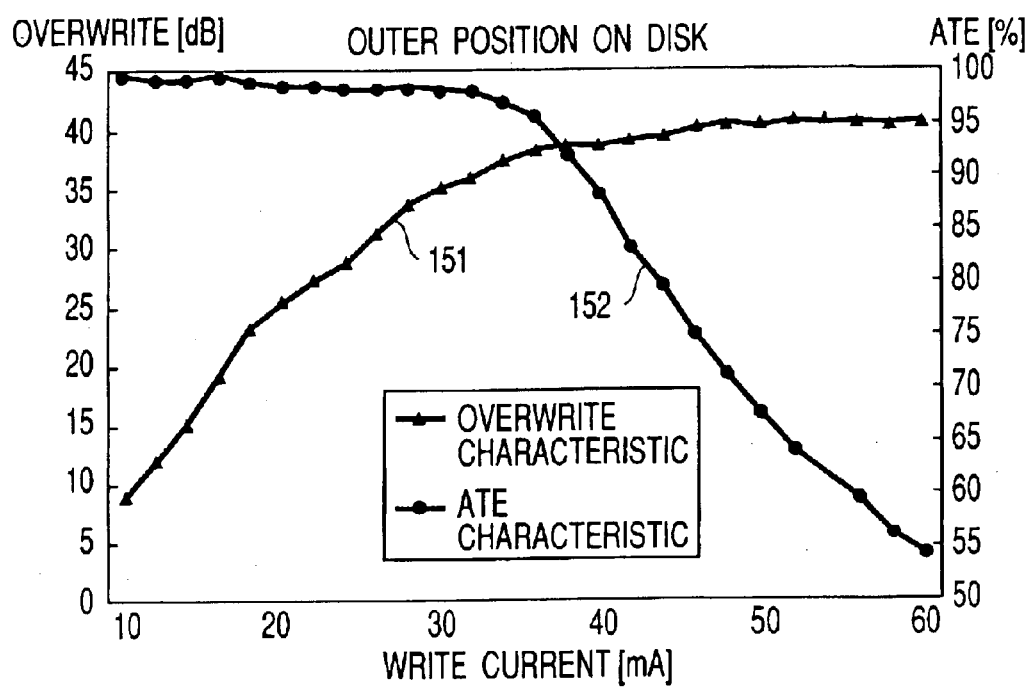
FIG. 14 is a view showing a data structure example of the delay table 921 applied in the first modification.
FIG. 15 is a view showing the overwrite characteristic and the ATE characteristic at an outer position on a recording medium 1.

A first modification of the embodiment according to the present invention will now be described. It can be expected that the overwrite characteristic and the ATE characteristic such as shown in FIG. 4 become characteristics having irregularities due to the characteristics of the recording medium 1 and the head 2. For example, like this embodiment, when the head 2 is arranged on each of the recording surfaces of the recording medium 1, the saturation current of the overwrite characteristic may possibly vary depending on each head 2 due to irregularities of the force maintaining the magnetized state of each recording surface of the recording medium 1. Furthermore, it can be expected that the ATE characteristic may deteriorate with the low write current depending on irregularities of the track width (head width) of each head 2. Therefore, it is possible to cope with an HDD having large irregularities of the characteristics of the recording medium 1 and each head 2 by optimizing the write current itself. In this case, it is sufficient to form the delay table 921 as shown in FIG. 14. That is, the optimum delay time d and the write current Iw are determined in accordance with each temperature T for each head 2 (head H) and stored in the delay table 921.

Figure 13:
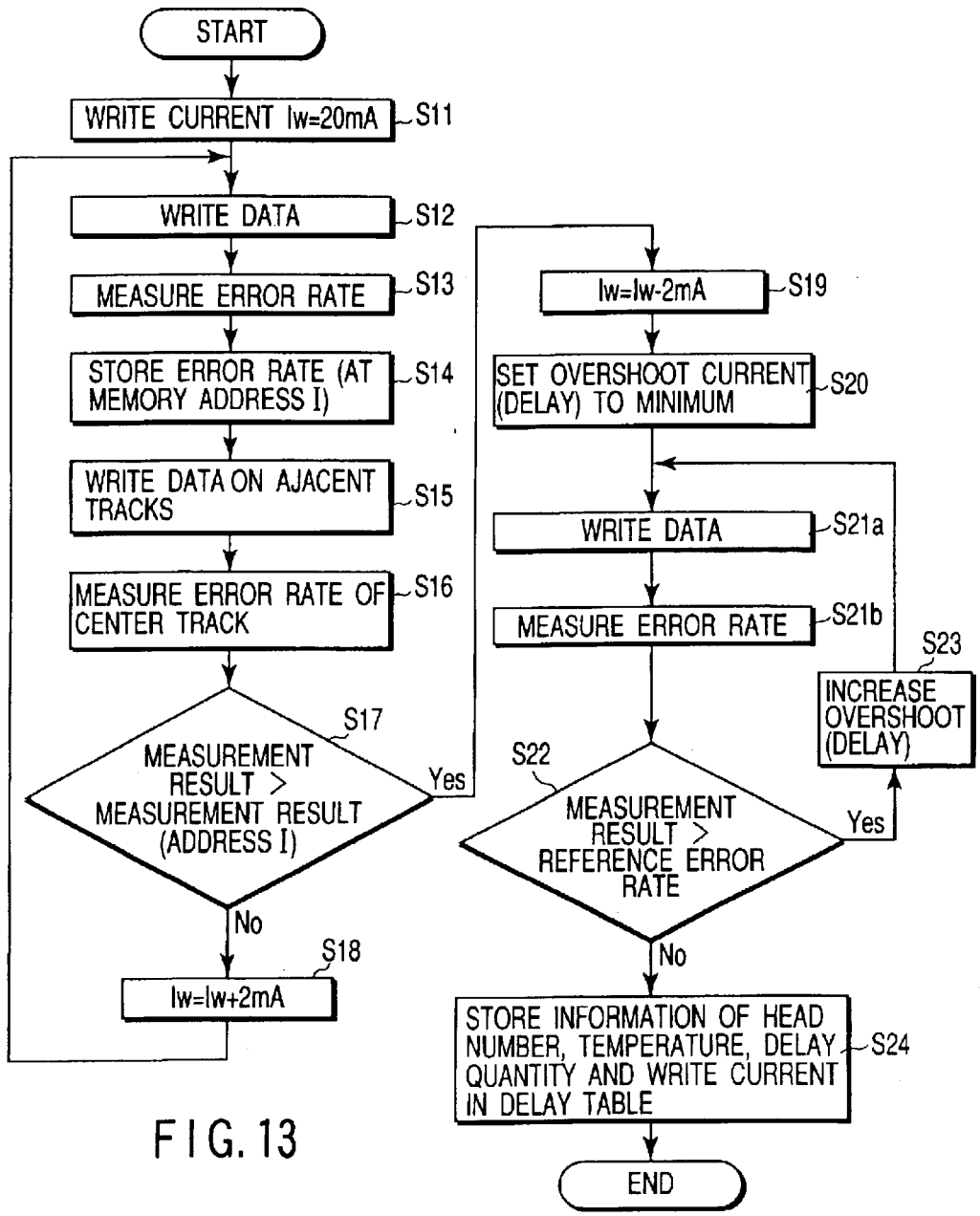
FIG. 13 is a flowchart for illustrating processing to obtain an optimum delay time and write current for each temperature with respect to each head and store them in the delay table 921 in a first modification of the embodiment.

Description will now be given as to processing to obtain the optimum delay time and the write current optimum for each temperature with respect to each head and store them in the delay table 921 with reference to the flowchart of FIG. 13. When shipping the HDD shown in FIG. 1, an operator sequentially switches and sets the environmental temperature T of the HDD in a plurality of stages. The operator inputs commands which direct optimization and storage of the delay time d and the write current Iw for each head with respect to the set temperature T from the host system to the control IC 9 of the HDD depicted in FIG. 1 every time the environmental temperature T is set. The control IC 9 starts processing according to the flowchart of FIG. 13 with respect to each head in accordance with the commands. Here, it is determined that the processing according to the flowchart of FIG. 1 is executed with respect to the head 2 (H0) of the heads arranged on the respective recording surfaces of the recording medium 1.

The control IC 9 (CPU 91 in the control IC 9) first sets the write current Iw output from the current source 711 in the write driver 71 provided to the head IC 7 to a predetermined current quantity (here, 20 mA) (step S11). Then, the control IC 9 writes first test data to all tracks or a plurality of predetermined continuous tracks on a corresponding recording surface of the recording medium 1 by the head 2 (step S12). Subsequently, the control IC 9 measures the error rate (step S13). This error rate measurement in step S13 can be realized by reading the data written to the recording medium 1 in step S12 in sector units and obtaining a percentage of a sector which results in an error. The control IC 9 stores the measured error rate at address I of the RAM 93 (step S14).

Meanwhile, an area of the recording medium 1 to which data is written in step S13 is divided in the radial direction of the recording medium in track units set consisting of three continuous tracks, and managed. The control IC 9 writes second test data to two tracks except a track at the center, namely, two tracks adjacent to the center track in accordance with the track set (step S15). The control IC 9 executes this writing to tracks adjacent to the center track with respect to each of a plurality of track sets.

Then, the control IC 9 reads data from each center track in units of a sector with respect to each of a plurality of the track sets, and obtains the error rate (step S16). The first test data is written to the center track in each track set in step S12. If the center track is adversely affected by the magnetic leakage flux in writing of the second test data to the tracks adjacent to the center track, the error rate obtained in step S16 is larger than the error rate acquired in step S13.

Thus, the control IC 9 judges whether the error rate obtained in step S16 (which will be referred to as the first error rate hereinafter) is larger than the error rate stored at address I in the RAM 93 (which will be referred to as the second error rate hereinafter) (step S17). If the first error rate does not exceed the second error rate, the control IC 9 determines that there is no influence of the magnetic leakage flux. In this case, the control IC 9 sets the write current Iw to a value which is increased by one stage (for example, 2 mA) (step S18). In this state, the control IC 9 again executes steps S12 to S17.

Conversely, if the first error rate exceeds the second error rate, the control IC 9 determines that there is a harmful effect of the magnetic leakage flux. In this case, the control IC 9 sets the write current Iw to a value which is decreased by one stage (2 mA) (step S19). The value of the write current Iw set in step S19 corresponds to a write current optimum at the currently set temperature T and to the head 2 (H0) currently selected.

Upon executing step S19, the control IC 9 carries out processing (steps S20 to S23) corresponding to steps S1 to S4 in the flowchart of FIG. 11, and determines the optimum delay time d corresponding to the optimum overshoot current. Then, the control IC 9 stores entry information including a set of the head number of the head 2, information of the temperature T, information of the delay time d and information of the write current Iw in the delay table 921 having the data structure shown in FIG. 14 (step S24).

Second Modification

Figure 16:
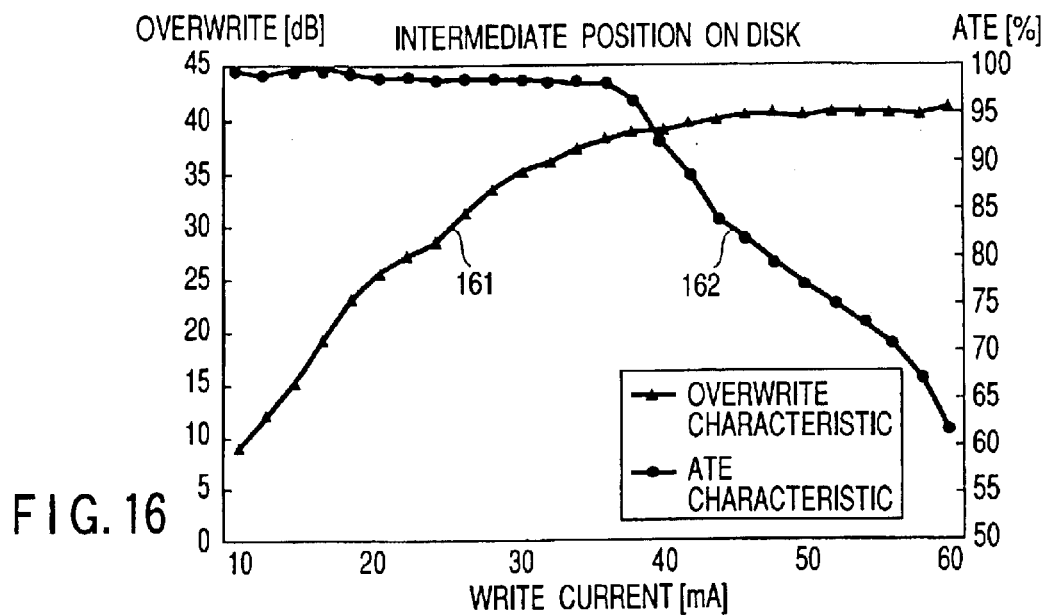
FIG. 16 is a view showing the overwrite characteristic and the ATE characteristic at an intermediate position on the recording medium 1.
Figure 17:
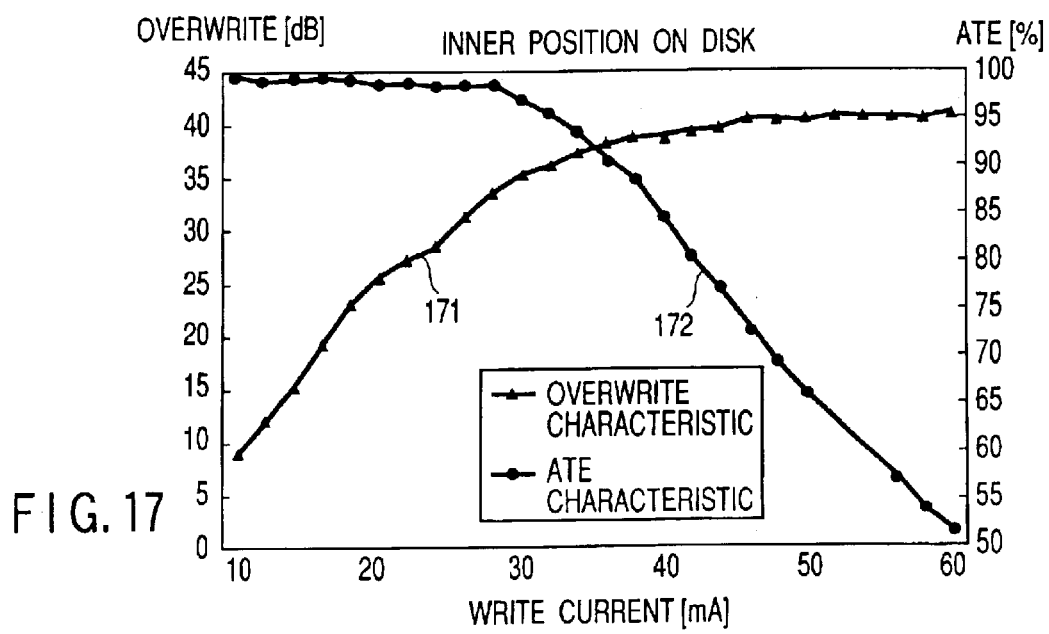
FIG. 17 is a view showing the overwrite characteristic and the ATE characteristic at an inner position on the recording medium 1.
Figures 18, 19:
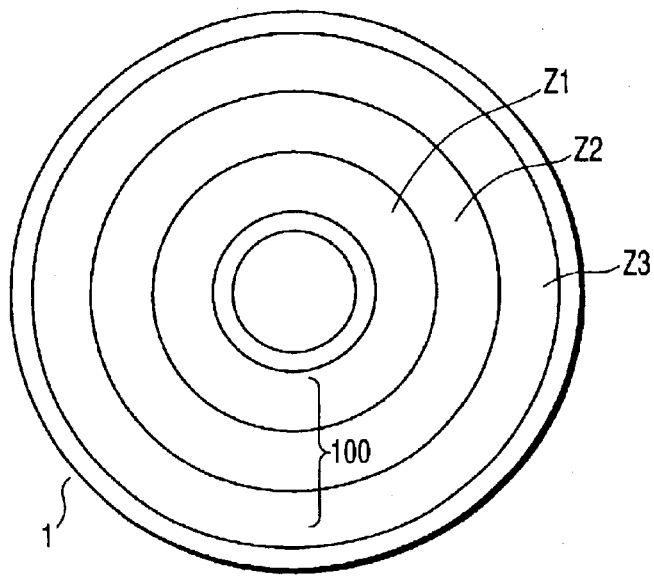
FIG. 18 is a view for illustrating a zone on the recording medium 1 which can be an unit for optimizing the write current and the overshoot current (delay time) in a second modification in the embodiment.
FIG. 19 is a view showing a data structure example of the delay table 921 applied in the second modification.

A second modification of the embodiment according to the present invention will now be described. FIG. 15 shows an overwrite characteristic 151 and an ATE characteristic 152 at an outer position on the recording medium 1. FIG. 16 shows an overwrite characteristic 161 and an ATE characteristic 162 at an intermediate position on the recording medium 1. FIG. 17 shows an overwrite characteristic 171 and an ATE characteristic 172 at an inner position on the recording medium 1. As apparent from FIGS. 15 to 17, the ATE characteristic varies depending on the position on the recording medium 1 in the radial direction. That is, the degree of influence of the magnetic leakage flux on adjacent tracks varies depending on the position on the recording medium 1 in the radial direction. Therefore, it can be expected that the optimum write current and the optimum overshoot current (delay time) also vary in accordance with each position on the recording medium 1 in the radial direction. Thus, further stabilized performances can be assured by optimizing the write current and the overshoot current (delay time) in accordance with each position on the recording medium 1 in the radial direction. Specifically, as shown in FIG. 18, it is sufficient to divide an area 100 on a recoding surface of the recording medium 1 into a plurality of zones in the radial direction and manage them, and further optimize the write current and the overshoot current (delay time) in accordance with each zone. Here, the area 100 is divided into, e.g., three zones Z1, Z2 and Z3 and managed. Procedures shown in the flowchart of FIG. 13 can be utilized for optimization. FIG. 19 shows a data structure example of the delay table 921 in this case. It is to be noted the stabilized performances can be assured by effecting optimization in accordance with each position on the recording medium 1 in the radial direction with respect to each head.

In all of this embodiment and the first and second modifications of this embodiment, the optimum overshoot current (delay time) is set in accordance with each temperature when shipping the HDD. However, the optimum overshoot current (delay time) can be set even after shipment. In order to set this current, assuring a dummy write area, to which a user cannot have access, on a recording surface of the recording medium 1 can suffice, for example. In this case, the optimum overshoot current (delay time) can be set by measuring the error rate with the dummy write area as a target in accordance with the flowchart of FIG. 11. Further, the optimum write current and the optimum overshoot current (delay time) can be set even after shipment by measuring the error rate with the dummy write area as a target in accordance with the flowchart of FIG. 13. It is sufficient for this setting processing to be automatically executed by the control IC 9 when the temperature detected by the temperature sensor 10 deviates from the temperature range indicated by temperature information stored in the delay table 921, for example. In order to achieve this, it is sufficient that the control IC 9 periodically monitors the temperature detected by the temperature sensor 10, for example.

Third Modification

Figure 20:
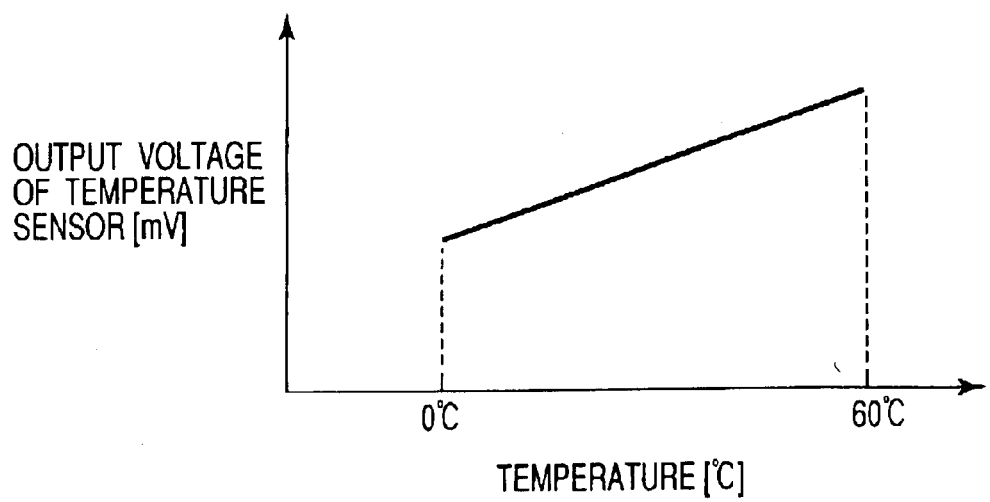
FIG. 20 is a view showing an output voltage characteristic of a temperature sensor 10 relative to a temperature.

A third modification of this embodiment according to the present invention will now be described. FIG. 20 shows an output voltage characteristic of the temperature sensor 10 in a temperature range (for example, 0° C. to 60° C.) which guarantees the operation of the HDD. As shown in this drawing, the output voltage of the temperature sensor 10 applied in this embodiment linearly varies with respect to the temperature at least in the temperature range which guarantees the operation of the HDD.

Figure 21:
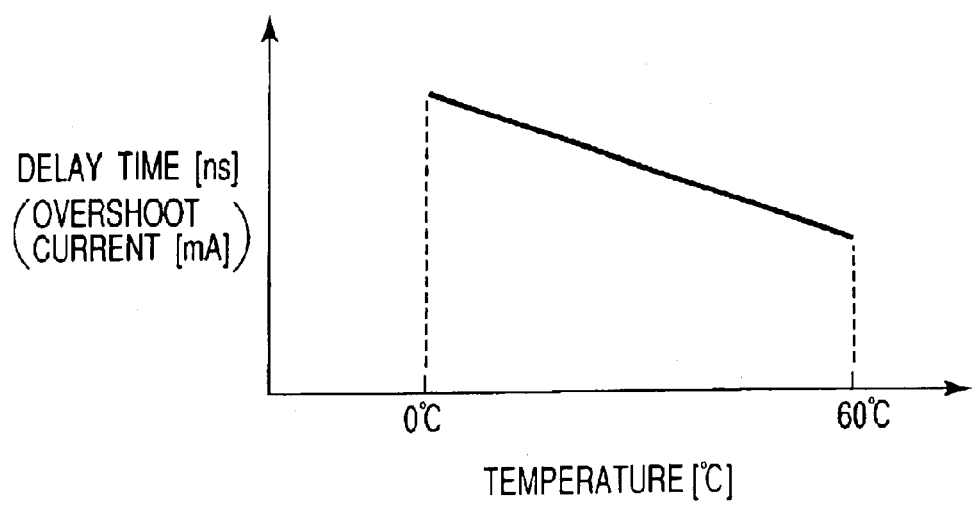
FIG. 21 is a view showing a relationship between a temperature and an optimum delay time (optimum overshoot current) relative to the temperature.

FIG. 21 shows the relationship between the temperature (environmental temperature of the HDD) in the temperature range guaranteeing the operation of the HDD and the optimum delay time (optimum overshoot current) relative to the temperature. As shown in the drawing, the optimum delay time (optimum overshoot current) varies linearly with respect to the environmental temperature of the HDD in the temperature range guaranteeing the operation of the HDD.

When the temperature sensor 10 having the characteristic shown in FIG. 20 is used, the optimum delay time (overshoot current) varies linearly with respect to the output voltage of the temperature sensor 10 as apparent from FIG. 21. Therefore, it is sufficient to linearly change the optimum delay time which gives the optimum overshoot current in accordance with the output voltage of the temperature sensor 10. By doing so, the optimum overshoot current can be dynamically set in accordance with the environmental temperature at that moment when the HDD shown in FIG. 1 is used.

Figure 22:
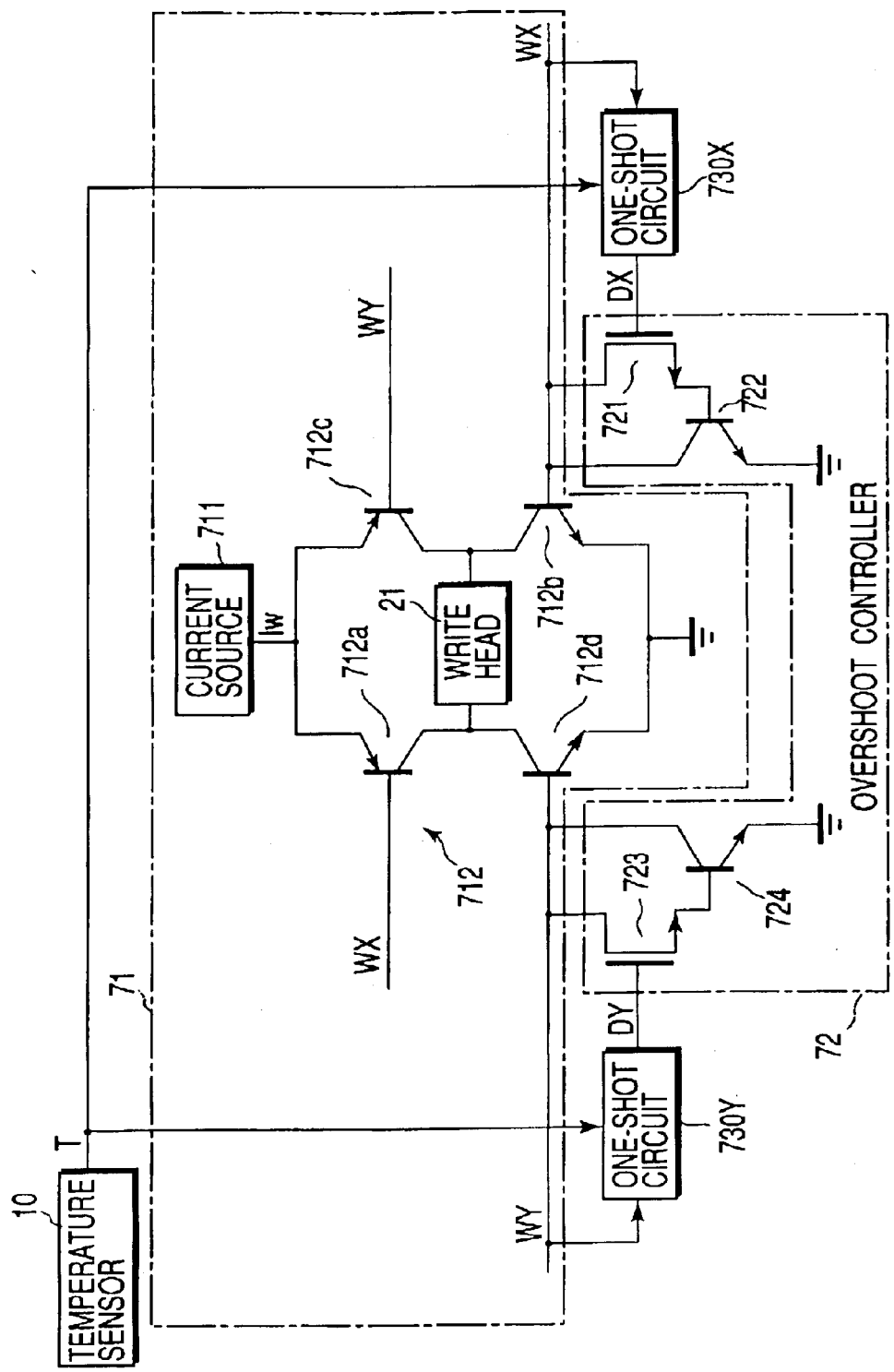
FIG. 22 is a view showing a structure of a periphery of a write driver 71 having a circuit which controls the overshoot current added thereto which is applied in a third modification of the embodiment.

A characteristic of the third modification lies in that the optimum overshoot current (delay time) is dynamically set in accordance with the environmental temperature at that moment when the HDD shown in FIG. 1 is used. FIG. 22 shows a structure of the periphery of the write driver having the overshoot controller added thereto in the head IC 7 applied in the third modification. It is to be noted that like reference numerals denote parts equivalent to those in FIG. 5. The structure of FIG. 22 is different from that of FIG. 5 in that one-shot circuits 730X and 730Y are used in place of the one-shot circuits 73X and 73Y. The one-shot circuits 730X and 730Y, respectively, output signals DX and DY each consisting of a string of pulses which become high only for a fixed time after times D1 and D2 (D2=D1) which are in proportion to the output voltage of the temperature sensor 10 (temperature T indicated by the output voltage) every time the signals WX and WY change their states from low to high. As a result, the optimum delay time is dynamically set in accordance with the environmental temperature of the HDD. Therefore, in the third modification, the optimum overshoot current can be automatically set without control by the control IC 9 and without preparing the delay table 921.

In the foregoing embodiments according to the present invention, a hard disk drive is used as the disk storage apparatus. However, the present invention can use a general disk storage apparatus such as an optical disk drive or a magneto-optical disk drive.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk storage apparatus in which writing of data onto a discoid recording medium and reading of data from the recording medium are carried out by a head, comprising:

a write driver which supplies a write current to the head in accordance with write data, wherein the write driver includes a current source which generates the write current, and a bridge circuit containing a pair of first transistors and a pair of second transistors, the pair of first transistors supplying the write current generated by the current source to the head in a first direction in accordance with a first control signal corresponding to the write data, the pair of second transistors supplying the write current generated by the current source to the head in a second direction opposite to the first direction in accordance with a second control signal corresponding to the write data;

a temperature sensor which detects the environmental temperature of the disk storage apparatus;

a controller which controls an overshoot current included in the write current supplied from the write driver to the head in accordance with the temperature detected by the temperature sensor, wherein the controller includes an overshoot controller which controls the overshoot included in the write current supplied from the write driver to the head, and a main controller which controls the overshoot controller in accordance with the temperature detected by the temperature sensor;

a first pulse generation circuit which generates a first pulse after elapse of a delay time determined from an output voltage of the temperature sensor and outputs it to the overshoot controller every time the first control signal changes its state from a first logic state to a second logic state, and whose delay time can be varied; and a second pulse generation circuit which generates a second pulse after elapse of a delay time determined from an output voltage of the temperature sensor and outputs it to the overshoot controller every time the second control signal changes its state from the first logic state to the second logic state, and whose delay time can be varied, wherein the main controller sets in the first and second pulse generation circuits a delay time determined by the parameter value corresponding to the temperature detected by the temperature sensor, and wherein the overshoot controller controls the overshoot current by controlling the base potential of a transistor on the outflow side of the write current in the pair of first transistors in accordance with a pulse output from the first pulse generation circuit, and by controlling the base potential of a transistor on the outflow side of the write current in the pair of second transistors in accordance with a pulse output from the second pulse generation circuit.

2. The disk storage apparatus according to claim 1, further comprising:

storing means for storing a parameter value used to set an optimum overshoot current for each corresponding temperature;

wherein the main controller reads a parameter value from the storing means corresponding to a temperature detected by the temperature sensor and controls the overshoot controller in accordance with the parameter value.

3. A disk storage apparatus in which writing of data onto a discoid recording medium and reading of data from the recording medium are carried out by a head, comprising:

a write driver which supplies a write current to the head in accordance with write data, wherein the write driver includes a current source which generates the write current, and a bridge circuit containing a pair of first transistors and a pair of second transistors, the pair of first transistors supplying the write current generated by the current source to the head in a first direction in accordance with a first control signal corresponding to write data, the pair of second transistors supplying the write current generated by the current source to the head in a second direction opposite to the first direction in accordance with a second control signal corresponding to the write data;

a temperature sensor which detects the environmental temperature of the disk storage apparatus;

a controller which controls an overshoot current included in the write current supplied from the write driver to the head in accordance with temperature detected by the temperature sensor;

a first pulse generation circuit which generates a first pulse after elapse of a delay time determined from an output voltage of the temperature sensor and outputs it to the controller every time the first control signal changes its state from a first logic state to a second logic state, and whose delay time can be varied; and a second pulse generation circuit which generates a second pulse after elapse of a delay time determined from an output voltage of the temperature sensor and supplies it to the controller every time the second control signal changes its state from the first logic state to the second logic state, and whose delay time can be varied, wherein the controller controls the overshoot current by controlling the base potential of a transistor on the outflow side of the write current in the pair of first transistors in accordance with a pulse output from the first pulse generation circuit, and by controlling the base potential of a transistor on the outflow side of the write current in the pair of second transistors in accordance with a pulse output from the second pulse generation circuit.

4. A method of controlling a write current to a head from a write driver in accordance with write data in a disk storage apparatus in which writing of data onto a discoid recording medium and reading of data from the recording medium are carried out by the head, the method comprising:

measuring the environmental temperature of the disk storage apparatus;

reading a parameter value corresponding to the measured environmental temperature from a table storing a parameter value indicative of an optimum overshoot current in accordance with each corresponding temperature;

measuring the error rate by utilizing a dummy write area which is assured on the recording medium and to which a user cannot have access, the error rate being measured while switching the overshoot current;

determining the optimum overshoot current at the environmental temperature of the disk storage apparatus at that moment in accordance with the result of measuring the error rate;

storing the parameter value corresponding to the determined optimum overshoot current in the table in association with the environmental temperature of the disk storage apparatus at that moment; and controlling an overshoot current included in the write current supplied from the write driver to the head in accordance with the read parameter value corresponding to the measured environmental temperature.

5. The method according to claim 4, further comprising:

sequentially switching the environmental temperature of the apparatus in a plurality of stages when shipping the disk storage apparatus;

measuring the error rate while switching the overshoot current at each of the switched temperatures;

determining the optimum overshoot current for each of the temperatures in accordance with a result of measuring the error rate; and storing the parameter value corresponding to the optimum overshoot current for each of the temperatures in the table.

6. The method according to claim 4, wherein a parameter value indicative of the optimum overshoot current is stored in accordance with each zone partitioned by dividing a recording surface of the recording medium in the radial direction at each predetermined temperature in the table; and in the reading, a parameter corresponding to the measured environmental temperature and the zone in which the head is positioned is read from the table.

7. The method according to claim 6, further comprising:

sequentially switching the environmental temperature of the apparatus in a plurality of stages when shipping the disk storage apparatus;

measuring the error rate while switching the overshoot current in accordance with each of the zones at each of the switched temperatures;

determining the optimum overshoot current for each zone at each of the temperatures in accordance with the result of measuring the error rate; and storing the parameter value corresponding to the optimum overshoot current for each zone at each of the temperatures in the table.

8. A method of controlling a write current supplied to a head from a write driver in accordance with write data in a disk storage apparatus in which writing of data onto a discoid recording medium and reading of data from the recording medium are carried out by the head, the recording medium including two recording surfaces, a pair of heads including the head being arranged in accordance with one and the other one of the two recording surfaces, respectively, the write current being supplied from the write driver to a head selected from the pair of heads in accordance with write data, the method comprising:

measuring the environmental temperature of the disk storage apparatus;

reading parameter values indicative of the optimum write current and the overshoot current corresponding to the measured environmental temperature and the selected head from a table storing parameter values indicative of the optimum write current and the overshoot current in accordance with each corresponding temperature and each head;

sequentially switching the environmental temperature of the apparatus in a plurality of stages when shipping the disk storage apparatus;

measuring a first error rate while switching the write current in accordance with each of the heads at each of the switched temperatures;

determining the optimum write current for each of the heads at each of the temperatures in accordance with the result of measuring the first error rate;

measuring a second error rate while switching the overshoot current for each of the heads at each of the temperatures with the optimum write current determined in accordance with that temperature and that head being set;

determining the optimum overshoot current for each of the heads at each of the temperatures in accordance with the result of measuring the second error rate;

storing parameter values corresponding to the optimum write current and the optimum overshoot current for each of the heads at each of the temperatures in the table;

controlling an overshoot current included in the write current supplied from the write driver to the selected head in accordance with the read parameter value of the optimum overshoot current; and controlling the write current supplied from the write driver to the selected head in accordance with the read parameter value of the optimum write control.

9. The method according to claim 8, wherein the parameter values indicative of the optimum write current and the current are stored in accordance with each head at each corresponding temperature and in accordance with each zone partitioned by dividing the recording surface of the recording medium in the radial direction in the table; and in the reading, a parameter value corresponding to the measured environmental temperature, the selected head and the zone in which the selected head is positioned is read from the table.

10. A method of controlling a write current supplied to a head from a write driver in accordance with write data in a disk storage apparatus in which writing of data onto a discoid recording medium and reading of data from the recording medium are carried out by the head, the recording medium including two recording surfaces, a pair of heads including the head being arranged in accordance with one and the other one of the two recording surfaces, respectively, the write current being supplied from the write driver to a head selected from the pair of heads in accordance with write data, the method comprising:

measuring the environmental temperature of the disk storage apparatus;

reading parameter values indicative of the optimum write current and the overshoot current corresponding to the measured environmental temperature and the selected head from a table storing parameter values indicative of the optimum write current and the overshoot current in accordance with each corresponding temperature and each head, wherein the parameter values indicative of the optimum write current and the overshoot current are stored in accordance with each head at each corresponding temperature and in accordance with each zone partitioned by dividing the recording surface of the recording medium in the radial direction in the table, and wherein, in the reading, a parameter value corresponding to the measured environmental temperature, the selected head and the zone in which the selected head is positioned is read from the table;

sequentially switching the environmental temperature of the apparatus in a plurality of stages when shipping the disk storage apparatus;

measuring a first error rate while switching the write current for each of the heads at each of the switched temperatures in accordance with each of the zones;

determining the optimum write current for each of the heads at each of the temperatures in accordance with each of the zones in response to the result of measuring the first error rate;

measuring a second error rate while switching the overshoot current or each of the heads at each of the switched temperatures in accordance with each of the zones with the optimum write current determined in accordance with that temperature, that head and that zone being set;

determining the optimum overshoot current for each of the heads at each of the temperatures in accordance with each of the zones in response to the result of measuring the second error rate;

storing parameter values corresponding to the optimum write current and the optimum overshoot current for each of the heads at each of the temperatures in accordance with each of the zones in the table;

controlling an overshoot current included in the write current supplied from the write driver to the selected head in accordance with the read parameter value of the optimum overshoot current; and controlling the write current supplied from the write driver to the selected head in accordance with the read parameter of the optimum write current.

* * * * *